Patented May 13, 1947

2,420,497

UNITED STATES PATENT OFFICE 2,420,497

PROCESSES FOR THE PURIFICATION OF TRIPENTAERYTHRITOL

Herman A. Poitras, Teaneck, and John E. Snow, Hasbrouck Heights, N. J., assignors to Heyden Chemical Corporation, New York, N. Y., a corporation of Delaware Application December 7, 1943, Serial No. 513,222

9 Claims. (Cl. 260—615)

1

This invention relates to the purification of tripentaerythritol and the separation of tripentaerythritol and dipentaerythritol from each other and from impurities, such as commercial filter aids, that are insoluble in aqueous acid solutions. This invention is an improvement over the fractional-crystallization procedure for the separation of dipentaerythritol and tripentaerythritol that is described in the application of John P. Remensnyder, Philip I. Bowman, and Robert H. Barth, Serial No. 484,478, filed April 24, 1943.

The main objects of this invention are to provide a process for the separation of dipentaerythritol and tripentaerythritol from each other and to increase the solubility of tripentaerythritol in aqueous solutions. In accordance with the process of this invention, this increase in solubility is accomplished by the use of mineral or simple carboxylic acids.

In the process described in application Serial No. 484,478 above referred to, tripentaerythritol is formed along together with pentaerythritol and dipentaerythritol by the reaction of acetaldehyde, formaldehyde and alkali. The tripentaerythritol and dipentaerythritol are insoluble in the reaction liquor and are removed by filtration. This filtration is very slow and difficult to carry out. If enough water is added, or the temperature is raised so that the dipentaerythritol remains soluble, the tripentaerythritol can be removed by filtration. This filtration is also slow, due to the finely divided character of the tripentaerythritol. Commercial filter aid added at this point, however, makes this separation possible. The use of the newly discovered fact that tripentaerythritol is more soluble in hot aqueous acids than in hot water makes it possible to remove tripentaerythritol from the filter aid economically and thereby provide an advantageous process for the separation of tripentaerythritol from dipentaerythritol, monopentaerythritol, and other water-soluble materials in the reaction liquor.

Monopentaerythritol has a solubility in water of about 8 parts in 100 parts of solution at 25° C., and about 100 parts in 100 parts of solution at 100° C. Dipentaerythritol is less soluble, its solubility in water being about 0.5 part in 100 parts of solution at 25° C. and about 14 parts in 100 parts of solution at 100° C. Tripentaerythritol is the least soluble, its solubility in water being about 0.1 part in 100 parts of solution at 25° C. and about 1 part in 100 parts of solution at 100° C. This very low solubility makes it impractical to dissolve the tripentaerythritol away from the in-

2 organic impurities or filter aid which may have been added earlier in the processing.

The curves shown in the accompanying drawing, in which are plotted the solubilities at 100° C. of tripentaerythritol in aqueous solutions of various acids at various concentrations, illustrate the increased solubilities caused by use of acids in conjunction with water as a solvent. In addition to the advantage of this increased solubility, the tripentaerythritol crystals obtained by cooling are so very much larger and so evenly formed as to size and shape that their filtration rate is very greatly improved.

Figure 1:
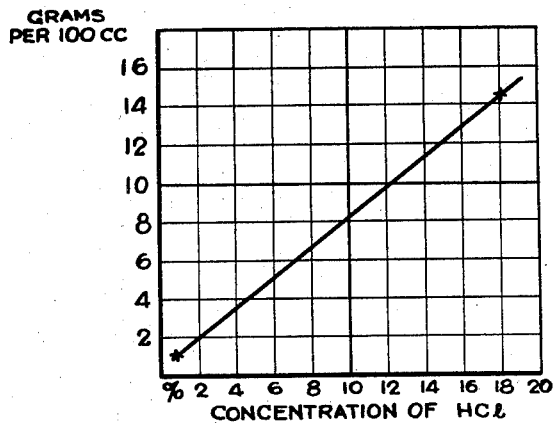
Fig. 1 is a curve showing the solubility of tripentaerythritol in grams per 100 cc. of solution in aqueous solutions containing different concentrations of hydrochloric acid.
Figure 2:
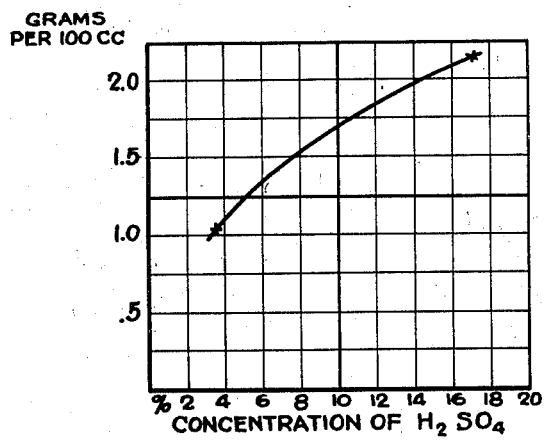
Fig. 2 is a curve showing the solubility of tripentaerythritol in grams per 100 cc. of solution in aqueous solutions containing different concentrations of sulfuric acid.
Figure 3:
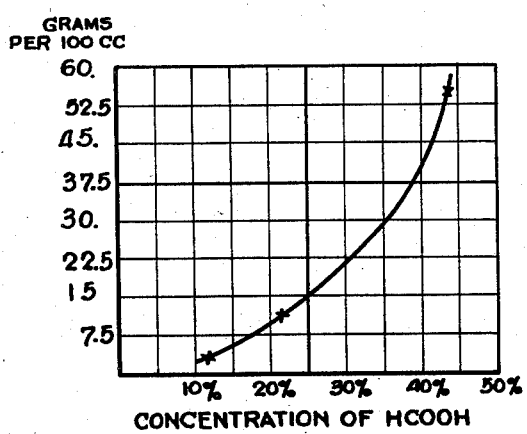
Fig. 3 is a curve showing the solubility of tripentaerythritol in grams per 100 cc. of solution in aqueous solutions containing different concentrations of formic acid.

The solubility of tripentaerythritol in water and in 6% and 18% by weight hydrochloric acid at 25° C. and at 100° C., expressed as grams per 100 grams of solution, is as follows:

| Temperature | Water | 6% HCl | 18% HCl |
|---|---|---|---|
| 25° C | 0.04 | 0.1 | 1 |
| 100° C | 0.98 | 1.64 | 14.3 |

The following examples illustrate how the invention may be practiced:

*Example 1.*—Fifty (50) parts of a wet mixture of technical tripentaerythritol and commercial filter aid which analyzed 40.5% water, 26.8% filter aid, and about 30% tripentaerythritol, was mixed with 200 parts of 30% formic acid and heated to boiling for one hour. The filter aid was removed by filtering on a heated filter and was washed with 25 parts of 30% formic acid. Upon drying, it weighed 13.4 parts. The filtrate was cooled to 25° C., and allowed to stand overnight to crystallize out the tripentaerythritol. Tripentaerythritol, 5 parts, was obtained when the mixture was filtered, washed with water, dried and weighed.

*Example 2.*—Fifty (50) parts of a wet mixture of technical tripentaerythritol and commercial filter aid which analyzed 40.5% water, 26.8% filter aid, and about 30% tripentaerythritol was mixed with 150 parts of 15% hydrochloric acid and heated to boiling for one hour. The filter aid was removed by filtering on a heated filter and was washed with 25 parts of 15% hydrochloric acid. The filtrate was cooled to 25° C. and allowed to stand 24 hours. The tripentaerythritol obtained was filtered, washed with water, and dried. It weighed 7.6 parts.

*Example 3.*—A mixture of 2.5 parts of tripentaerythritol and 25 parts of 17.5% sulfuric acid were boiled for one-half hour. After cooling to 25° C. and standing overnight, 2.2 parts of tripentaerythritol were recovered.

Having thus described our invention, what we claim as new and desire to secure by Letters Patent is:

1. A process for the separation of tripentaerythritol from water-insoluble impurities which comprises suspending the tripentaerythritol containing water-insoluble impurities in such an amount of an aqueous solution of an acid selected from the group consisting of formic, hydrochloric and sulfuric acids maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove the water-insoluble impurities, and subsequently crystallizing tripentaerythritol from the hot aqueous acid solution by allowing the solution to cool and crystals to form.

2. A process for the separation of tripentaerythritol from water-insoluble impurities which comprises suspending the tripentaerythritol containing water-insoluble impurities in such an amount of an aqueous solution of hydrochloric acid maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove the water-soluble impurities, and subsequently crystallizing tripentaerythritol from the hot aqueous acid solution by allowing the solution to cool and crystals to form.

3. A process for the separation of tripentaerythritol from water-insoluble impurities which comprises suspending the tripentaerythritol containing water-insoluble impurities in such an amount of an aqueous solution of sulfuric acid maintained at a temperature approximating its boiling point that a substantial portion of the pentaerythritol is dissolved and the solution contains a higher proportion of tripentaerythritol than is soluble therein at approximately room temperature, filtering the hot acid solution of tripentaerythritol to remove the water-soluble impurities, and subsequently crystallizing tripentaerythritol from the hot aqueous acid solution by allowing the solution to cool and crystals to form.

4. A process for the separation of tripentaerythritol from water-insoluble impurities which comprises suspending the tripentaerythritol containing water-insoluble impurities in such an amount of an aqueous solution of formic acid maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove the water-soluble impurities, and subsequently crystallizing tripentaerythritol from the hot aqueous acid solution by allowing the solution to cool and crystals to form.

5. A process for the separation of dipentaerythritol and tripentaerythritol from each other, which comprises suspending the mixture containing dipentaerythritol and tripentaerythritol in such an amount of water at such a temperature that substantially all the dipentaerythritol is dissolved and a substantial portion of the tripentaerythritol remains undissolved, adding a conventional filter aid to the solution and removing the undissolved tripentaerythritol and filter aid therefrom by filtration, subsequently suspending the tripentaerythritol and filter aid in such an amount of an aqueous solution of an acid selected from the group consisting of formic, hydrochloric and sulfuric acids maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove filter aid and undissolved materials, and subsequently crystallizing tripentaerythritol from the hot aqueous acid solution by allowing the solution to cool and crystals to form.

6. A process for the separation of dipentaerythritol and tripentaerythritol from each other, which comprises suspending the mixture containing dipentaerythritol and tripentaerythritol in such an amount of water at such a temperature that substantially all the dipentaerythritol is dissolved and a substantial portion of the tripentaerythritol remains undissolved, adding a conventional filter aid to the solution and removing the undissolved tripentaerythritol and filter aid therefrom by filtration, subsequently suspending the tripentaerythritol and filter aid in such an amount of an aqueous hydrochloric acid solution maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove filter aid and undissolved materials and subsequently crystallizing tripentaerythritol from the hot aqueous acid solution by allowing the solution to cool and crystals to form.

7. A process for the separation of dipentaerythritol and tripentaerythritol from each other, which comprises suspending the mixture containing dipentaerythritol and tripentaerythritol in such an amount of water at such a temperature that substantially all the dipentaerythritol is dissolved and a substantial portion of the tripentaerythritol remains undissolved, adding a conventional filter aid to the solution and removing the undissolved tripentaerythritol and filter aid therefrom by filtration, subsequently suspending the tripentaerythritol and filter aid in such an amount of an aqueous sulfuric acid solution maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove filter aid and undissolved materials and subsequently crystallizing tripentaerythritol from the hot aqueous acid solution by allowing the solution to cool and crystals to form.

8. A process for the separation of dipentaerythritol and tripentaerythritol from each other, which comprises suspending the mixture containing dipentaerythritol and tripentaerythritol in such an amount of water at such a temperature that substantially all the dipentaerythritol is dissolved and a substantial portion of the tripentaerythritol remains undissolved, adding a conventional filter aid to the solution and removing the undissolved tripentaerythritol and filter aid therefrom by filtration, subsequently suspending the tripentaerythritol and filter aid in such an amount of an aqueous formic acid solution maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove filter aid and undissolved materials and subsequently crystallizing tripentaerythritol from the hot aqueous acid solution by allowing the solution to cool and crystals to form.

9. A process for the separation of dipentaerythritol and tripentaerythritol from each other, which comprises suspending the mixture containing dipentaerythritol and tripentaerythritol in such an amount of water at such a temperature that substantially all the dipentaerythritol is dissolved and a substantial portion of the tripentaerythritol remains undissolved, adding a conventional filter aid to the solution and removing the undissolved tripentaerythritol and filter aid therefrom by filtration, subsequently suspending the tripentaerythritol and filter aid in such an amount of an aqueous hydrochloric acid solution having a concentration of approximately 15% by weight of hydrogen chloride maintained at a temperature approximating its boiling point that a substantial portion of the tripentaerythritol is dissolved and the solution contains a higher proportion of tripentaerythritol than is soluble therein at approximately room temperature, filtering the hot acid solution of tripentaerythritol to remove filter aid and undissolved materials and subsequently crystallizing tripentaerythritol from the hot aqueous acid solution by allowing the solution to cool and crystals to form.

HERMAN A. POITRAS.
JOHN E. SNOW.

REFERENCES CITED

The following references are of record in the file of this patent:

UNITED STATES PATENTS

| Number | Name | Date |
| --- | --- | --- |
| 2,333,696 | Bludworth | Nov. 9, 1943 |

FOREIGN PATENTS

| Number | Country | Date |
| --- | --- | --- |
| 101,031 | Sweden | Mar. 11, 1941 |